US012336498B2

(12) United States Patent
Fruge'

(10) Patent No.: US 12,336,498 B2
(45) Date of Patent: Jun. 24, 2025

(54) FLOATABLE PET KENNEL

(71) Applicant: Four G Vortex LLC, Metairie, LA (US)

(72) Inventor: Michelle R. Fruge', Metairie, LA (US)

(73) Assignee: Four G Vortex LLC, Metairie, LA (US)

( * ) Notice: Subject to any disclaimer, the term of this patent is extended or adjusted under 35 U.S.C. 154(b) by 0 days.

(21) Appl. No.: 18/200,721

(22) Filed: May 23, 2023

(65) Prior Publication Data

US 2023/0292697 A1  Sep. 21, 2023

(51) Int. Cl.
*A01K 1/03* (2006.01)
(52) U.S. Cl.
CPC .................... *A01K 1/034* (2013.01)
(58) Field of Classification Search
CPC .... A01K 1/034; A01K 1/0236; A01K 1/0245; A01K 1/035; B63B 22/24; B63B 25/006
USPC ............................................. 119/416; 441/38
See application file for complete search history.

(56) References Cited

U.S. PATENT DOCUMENTS

| | | | |
|---|---|---|---|
| 2,928,108 A | 3/1960 | Cochrane et al. | |
| 8,662,020 B1 | 3/2014 | Tecco | |
| 10,791,701 B2 | 10/2020 | Zemet | |
| 11,039,596 B2 | 6/2021 | Pan et al. | |
| 2011/0079971 A1* | 4/2011 | Lulevitch | A01K 1/0245 280/28.12 |
| 2015/0034018 A1* | 2/2015 | Edmonds | A01K 1/0245 119/496 |
| 2019/0230894 A1* | 8/2019 | Pan | A01K 1/0272 |

* cited by examiner

*Primary Examiner* — Joshua J Michener
*Assistant Examiner* — Nicole Paige Maccrate
(74) *Attorney, Agent, or Firm* — Taylor M. Norton; Norton IP Law Firm LLC

(57) ABSTRACT

A floatable pet kennel includes an enclosure having an upper housing, a lower housing, and a front opening. The upper housing and the lower housing are connected to each other to define the enclosure adapted to house a pet. The upper housing includes a plurality of upper housing walls, and the lower housing includes a plurality of lower housing walls. Each wall of the plurality of upper housing walls and the plurality of lower housing walls includes an exterior skin, an interior skin, and a floatation material layer sandwiched between the exterior skin and the interior skin, enabling the floatable pet kennel to float upright, on its side, and/or upside down. A front door is removably disposed at the front opening to enable the pet to enter and exit the enclosure. A plurality of perforations provides air ventilation and allow water to drain out of the floatable pet kennel.

20 Claims, 10 Drawing Sheets

FLOATABLE PET KENNEL

BACKGROUND OF THE INVENTION

Field of the Invention

The present invention relates generally to a pet animal carrier and more particularly to a floatable pet animal carrier for domestic pets that is buoyant in water and can be moved over water.

Description of the Related Art

Natural catastrophes such as floods, earthquakes, hurricanes, cyclones and the like are occurring more frequently over the recent years. When a natural disaster occurs, pet owners often utilize pet carriers to transport their respective pets to safety. However, such can prove difficult during, for instance, a flood event. A conventional outdoor pet shelter, such as a doghouse, does not provide adequate protection to the pet during a flood event. Animal carriers or kennels may be used to transport animals, such as pets, from place to place; however, conventional pet carriers or kennels can be difficult for pet owners to manage during a flood event, with rising waters. Therefore, there is a need for improved animal carriers or kennels.

Although some improvements to technologies have increased the efficacy of pet kennels to transport pets; however, the convention pet kennels are still generally bulky and difficult for pet owners to move during a flood event. Further, some convention pet kennels can be attached to external floating devices that enable the pet kennels to float. However, it may be inconvenient and time-consuming for the pet owners or pet rescuers to attach the external floating devices to the pet kennels during a flood event. In addition, the external floating devices increase weight of the pet kennels, and hence reduce their ease of use.

While conventional pet kennels may be suitable for the particular purposes employed, they would not be as suitable for the purposes of the present invention as disclosed hereafter. None of such conventional pet kennels disclose the unique structures and advantages of the present disclosure.

Accordingly, there is a need for pet kennels that will significantly increase ease of use of the pet kennels to transport pets during a flood event. In addition, there is a need for pet kennels that are lightweight, quickly accessible and can be safely used to move pets from one place to another during a flood event.

As disclosed in this application, the inventor has discovered novel and unique devices for efficiently and effectively transporting pets in a safe manner during catastrophic events such as flood events.

The devices disclosed herein avoid many of the drawbacks of existing methods and devices.

It is one prospect of the present invention to provide a novel pet kennel of simple but effective construction for convenient and efficient transportation of domesticated pets by pet owners during catastrophic flood events.

Embodiments of the present invention provide for a novel floatable pet kennel as described and defined in the description below and in the annexed claims which provide for improved safety, efficiency and effectiveness characteristics in order to conveniently and more effectively transport pets in a multitude of environments.

SUMMARY OF THE INVENTION

The following presents a simplified summary of the present disclosure in a simplified form as a prelude to the more detailed description that is presented herein.

Therefore, in accordance with embodiments of the invention, there is provided a floatable pet kennel that includes an enclosure configured to house a pet. In one embodiment, the enclosure includes an upper housing, a lower housing and a front opening. The upper housing and the lower housing are attached to each other to define the enclosure. The upper housing includes a plurality of upper housing walls and the lower housing includes a plurality of lower housing walls. Each wall of the plurality of upper housing walls and the plurality of lower housing walls include an exterior skin, an interior skin, and a floatation material layer sandwiched between the exterior skin and the interior skin.

In an embodiment, the exterior skin and the interior skin are made of plastic. Preferably, the exterior skin and the interior skin are made of High Density Poly Ethylene (HDPE). Further, the floatation material layer is made of marine polyurethane foam. In a preferred embodiment, the exterior skin and the interior skin are molded with the floatation material layer.

In an embodiment, the plurality of upper housing walls includes an upper housing back wall, an upper housing top wall, and upper housing side walls. Further, the plurality of lower housing walls includes a lower housing back wall, a lower housing bottom wall, and lower housing side walls. In a preferred embodiment, the upper housing back wall and the upper housing side walls include a plurality of first perforations, and the lower housing back wall, the lower housing bottom wall, and the lower housing side walls include a plurality of second perforations.

In one embodiment, shape and dimension of each perforation of the plurality of first perforations are same as shape and dimension of each perforation of the plurality of second perforations. In another embodiment, the shape and dimension of each perforation of the plurality of first perforations are different from the shape and dimension of each perforation of the plurality of second perforations.

Preferably, the floatable pet kennel further includes a front door that is removably disposed at the front opening. The front door enables the pet to enter and exit the enclosure. In one embodiment, the floatable pet kennel further includes a door latching mechanism disposed on at least one wall of the plurality of upper housing walls and the plurality of lower housing walls. In a preferred embodiment, the front door is removably attached to the at least one wall via the door latching mechanism. The front door is configured to close and open via the door latching mechanism.

In another embodiment of the present disclosure, the floatable pet kennel further includes a handle disposed at the upper housing top wall. The handle enables a user to lift the floatable pet kennel.

In yet another embodiment of the present disclosure, there is provided a floatable pet kennel that includes a plurality of walls including a bottom wall, a top wall, a back wall, and side walls. The side walls are connected to the bottom wall, the top wall and the back wall to define an enclosure adapted to house a pet. In a preferred embodiment, each wall of the plurality of walls includes an exterior skin, an interior skin, and a floatation material layer sandwiched between the exterior skin and the interior skin. The exterior skin and the interior skin are molded with the floatation material layer.

In a preferred embodiment, the floatable pet kennel further includes a front door removably attached to at least one wall of the plurality of walls. The front door enables the pet to enter and exit the enclosure.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which.

DETAILED DESCRIPTION

Figure 1:
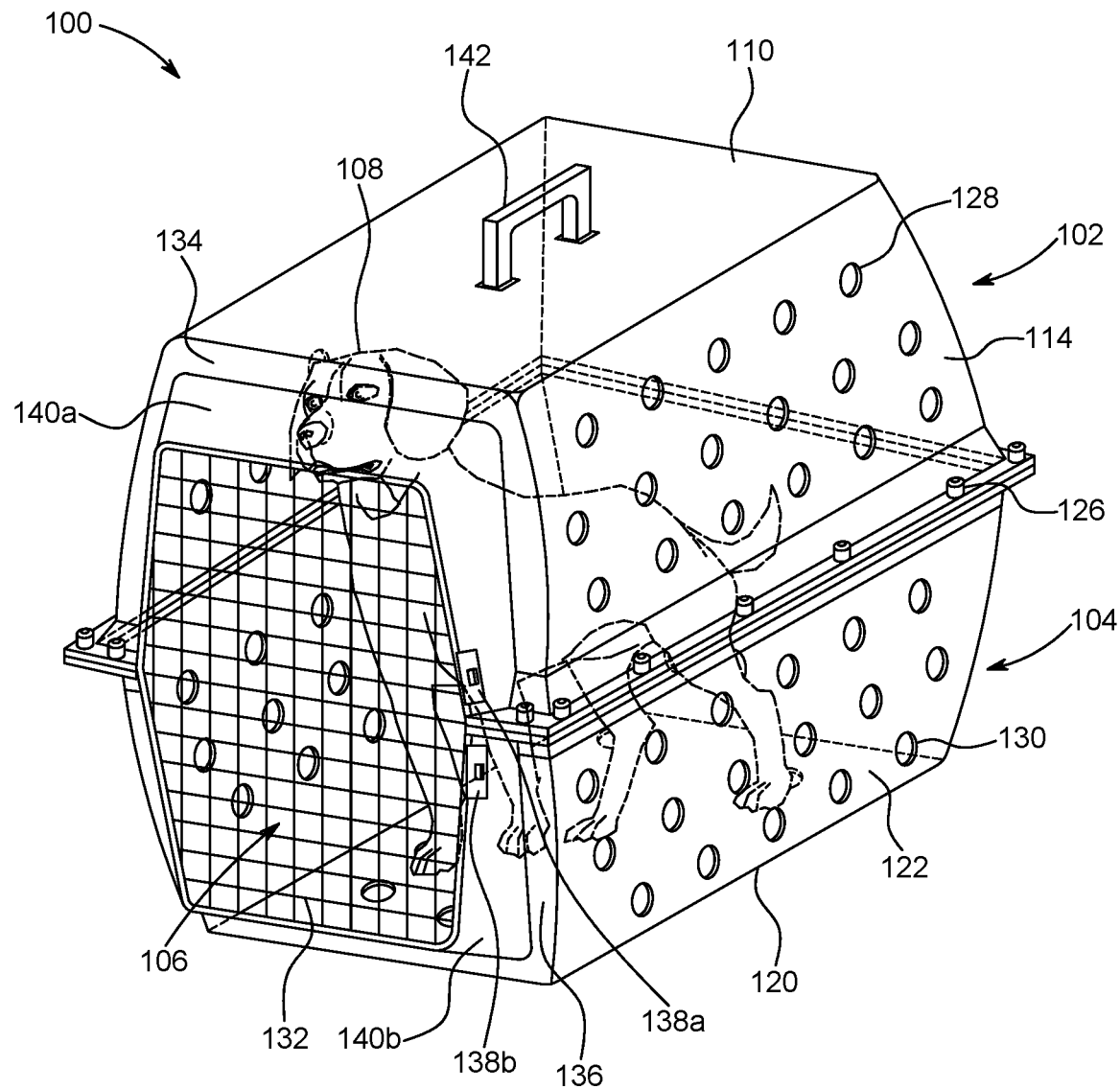
FIG. 1 is a front isometric view of a floatable pet kennel, in accordance with embodiments of the invention.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

Referring initially to FIGS. 1-8 and 10, the basic constructional details and principles of operation of embodiments of a floatable pet kennel 100 are provided.

Figure 2:
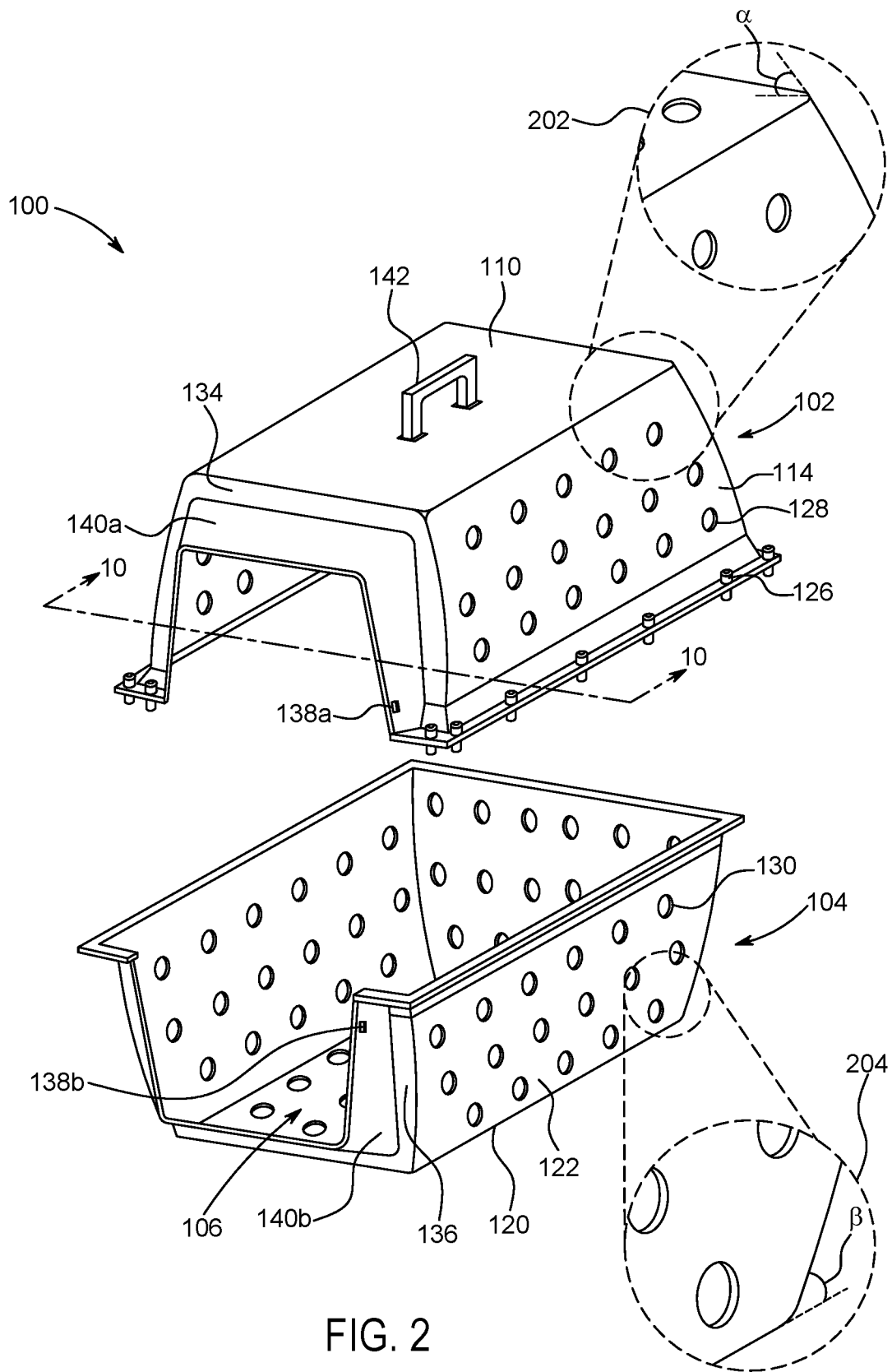
FIG. 2 is an exploded view of the floatable pet kennel, in accordance with embodiments of the invention.

As illustrated in FIGS. 1 and 2, in a preferred embodiment, the disclosed floatable pet kennel 100 includes an enclosure including an upper housing 102, a lower housing 104, and a front opening 106. In one embodiment, the upper housing 102 and the lower housing 104 are connected to each other to define the enclosure that is adapted to house a pet 108, as illustrated in FIG. 1. In one embodiment, the pet 108 is a dog, as exemplified in FIG. 1. In other embodiments, the pet 108 is a cat or any other domesticated pet.

In one embodiment, a pet owner uses the floatable pet kennel 100 to house the pet 108 in the enclosure. In another embodiment, the pet owner or a pet rescuer uses the floatable pet kennel 100 to safely rescue the pet 108 during a catastrophic event, for example, a flood event. Specifically, the pet owner or the pet rescuer houses the pet 108 in the enclosure and moves the floatable pet kennel 100 over water to transport the pet 108 from a flooded area to a safe shelter. The floatable pet kennel 100 is configured to float over water, and hence provides safe transportation means for the pet 108 during a flood event.

Preferably, referring to FIGS. 1, 2, 4-7 and 10, the upper housing 102 includes a plurality of upper housing walls including an upper housing top wall 110, an upper housing back wall 112, an upper housing right side wall 114 and an upper housing left side wall 116 (collectively referred to as upper housing side walls 114, 116). In one embodiment, the plurality of upper housing walls is molded together to form an integrated unitary structure of the upper housing 102. In an exemplary embodiment, the plurality of upper housing walls is molded together by known molding techniques, for example, injection molding, blow molding, and/or the like. In another embodiment, the plurality of upper housing walls is welded together, for example, by sonic welding.

In one embodiment, the upper housing top wall 110 is molded with top edges of the upper housing back wall 112 and the upper housing side walls 114, 116 such that each of the upper housing back wall 112 and the upper housing side walls 114, 116 are slanted at a first slant angle "a" relative to the upper housing top wall 110, as exemplified in FIGS. 1 and 2 and illustrated in view 202 of FIG. 2. In a preferred embodiment, the first slant angle "a" is in a range of 60 to 90 degrees. In one embodiment, the upper housing back wall 112 is slanted at same slant angle as the upper housing side walls 114, 116 relative to the upper housing top wall 110. In another embodiment, the upper housing back wall 112 is slanted at a different slant angle than the slant angles of the upper housing side walls 114, 116 relative to the upper housing top wall 110.

In some embodiments, the lower housing 104 has same structure and dimensions as the upper housing 102. Specifically, referring to FIGS. 1, 2, 4-6, 8, the lower housing 104 includes a plurality of lower housing walls including a lower housing back wall 118, a lower housing bottom wall 120, a lower housing right side wall 122 and a lower housing left side wall 124 (collectively referred to as lower housing side walls 122, 124).

In one embodiment, the lower housing bottom wall 120 is molded with bottom edges of the lower housing back wall 118 and the lower housing side walls 122, 124 such that each of the lower housing back wall 118 and the lower housing side walls 122, 124 are slanted at a second slant angle "β" relative to the lower housing bottom wall 120, as illustrated in view 204 of FIG. 2. In a preferred embodiment, the second slant angle "β" is in a range of 60 to 90 degrees. In one embodiment, the lower housing back wall 118 is slanted at same slant angle as the lower housing side walls 122, 124 relative to the lower housing bottom wall 120. In another embodiment, the lower housing back wall 118 is slanted at a different slant angle than the slant angles of the lower housing side walls 122, 124 relative to the lower housing bottom wall 120.

In one embodiment, the first slant angle "α" is same as the second slant angle "β". In other embodiment, the first slant angle "α" is different from the second slant angle "β".

Preferably, referring to FIGS. 1-8 and 10, bottom edges of the upper housing back wall 112, and the upper housing side walls 114, 116 are curved outwards towards exterior portion of the upper housing 102. Similarly, top edges of the lower housing back wall 118, and the lower housing side walls 122, 124 are curved outwards towards exterior portion of the lower housing 104. In a preferred embodiment, the curved edges of the walls described herein walls are connected to each other via a plurality of fasteners 126, thus forming the enclosure of the floatable pet kennel 100 adapted to house the pet 108, as exemplified in FIG. 1.

In one embodiment, the plurality of fasteners 126 is nut and bolt fasteners. In another embodiment, the plurality of fasteners 126 is screws. In yet another embodiment, the plurality of fasteners 126 is snap buttons. In an alternative embodiment of the present disclosure (not shown), the curved edges of the walls are connected to each other via an adhesive or a hinge connector.

Figure 10:
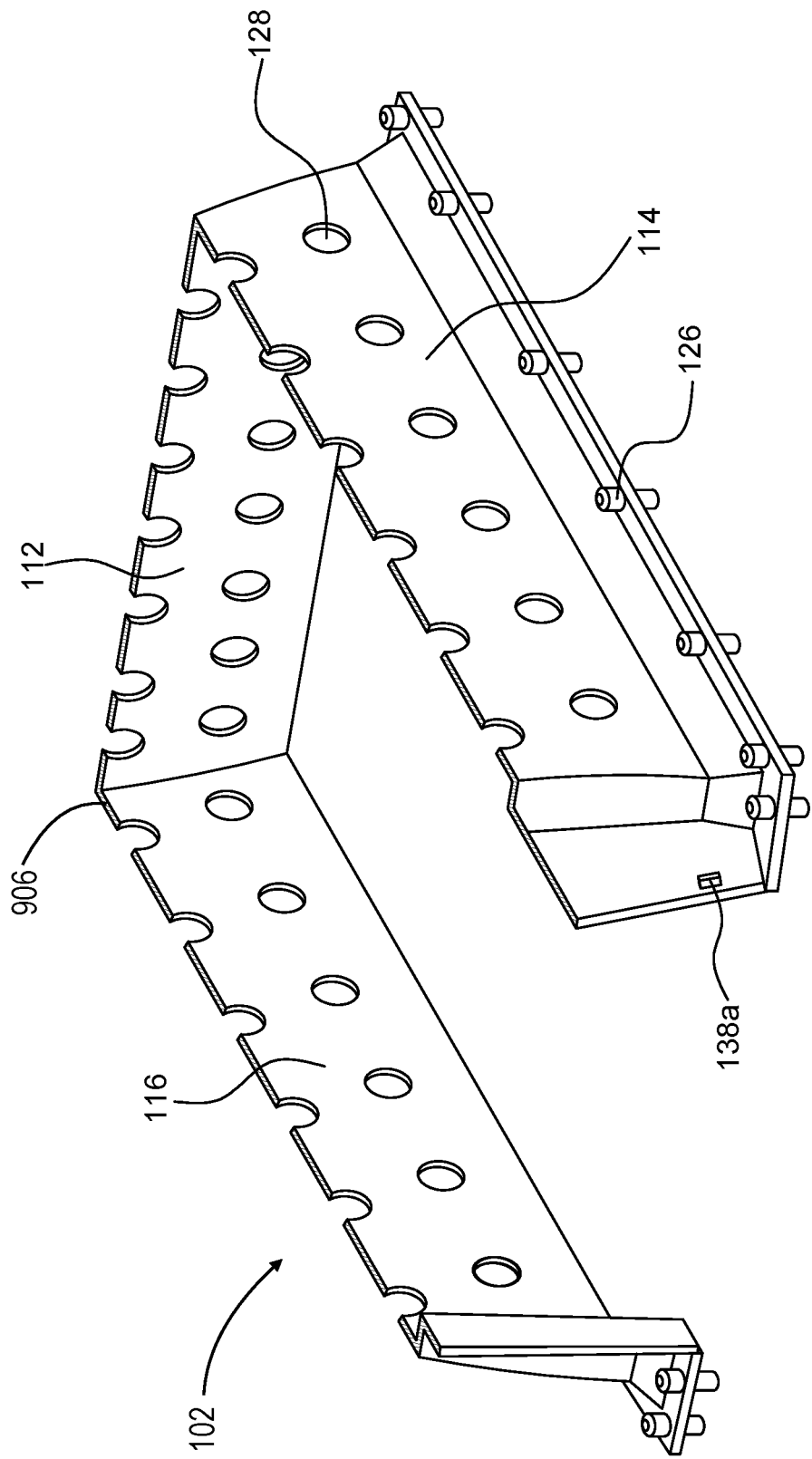
FIG. 10 is a cross sectional view along the cutting view 10-10 of FIG. 2, in accordance with embodiments of the invention.

In a preferred embodiment, referring to FIGS. 1-2, 4-7, and 10, the upper housing back wall 112, and the upper housing side walls 114, 116 include a plurality of first perforations 128. The plurality of first perforations 128 is disposed on each of the upper housing back wall 11 and the upper housing side walls 114, 116, as depicted in the cross sectional view of the upper housing 102 along the cutting view 10-10 of FIG. 2, as shown in FIG. 10.

Similarly, referring to FIGS. 1-2, 4-6, 8, the lower housing back wall 118, the lower housing bottom wall 120, and the lower housing side walls 122, 124 include a plurality of second perforations 130. In one embodiment, the plurality of first perforations 128 and the plurality of second perforations 130 enable the pet 108 to see outside the floatable pet kennel 100 when the pet 108 is housed in the enclosure. In another embodiment, the plurality of first perforations 128 and the plurality of second perforations 130 enable air ventilation in the enclosure, and hence ensure that the pet 108 is comfortable when the pet is housed in the floatable pet kennel 100 and rescued during a flood event.

Figure 9:
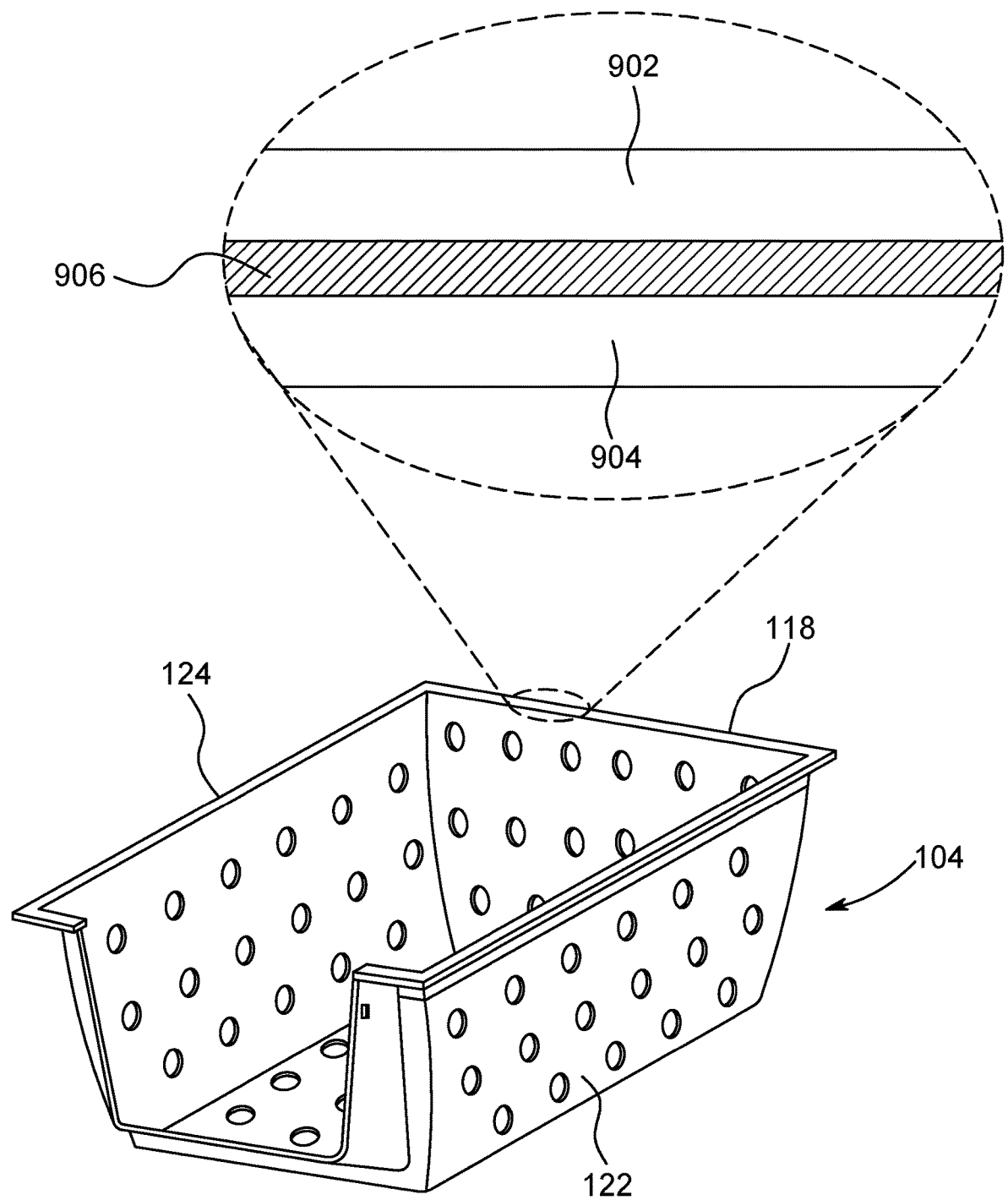
FIG. 9 is a perspective view of a wall of the floatable pet kennel, in accordance with embodiments of the invention.

Moreover, as can be seen from the disclosure herein, the plurality of first perforations 128 and the plurality of second perforations 130 allow water to drain out of the enclosure of the floatable pet kennel 100, such as, for example, when the floatable pet kennel 100 is floating on water due to the buoyancy of the floatation material layer 906 that is sandwiched between the exterior skin 902 and the interior skin 904 of the floatable pet kennel 100, as illustrated in FIGS. 9-10. In such embodiment, the floatable pet kennel 100 can float on top of water, while a pet is housed in the floatable pet kennel 100, and water that has entered the floatable pet kennel 100 during a storm event can drain out of the floatable pet kennel 100 through either the plurality of first perforations 128 or the plurality of second perforations 130.

In one embodiment, the plurality of first perforations 128 has same shape and dimensions as the shape and dimensions of the plurality of second perforations 130, as exemplified in FIGS. 1-8. In another embodiment, the plurality of first perforations 128 has different shape and dimensions than the shape and dimensions of the plurality of second perforations 130. Furthermore, in one embodiment, each perforation of the plurality of first perforations 128 and the plurality of second perforations 130 is shaped as a circle, as illustrated in FIGS. 1-8 and 10. Diameter of each perforation depends on the dimensions of the plurality of upper housing walls 110, 112, 114, 116 and the plurality of lower housing walls 118, 120, 122, 124. In another embodiment (not shown), each perforation of the plurality of first perforations 128 and the plurality of second perforations 130 is shaped as a rectangle, square, oval, triangle, and/or the like.

A count of perforations on each wall described above depends on the dimensions of the wall. Furthermore, in an exemplary embodiment, the plurality of first perforations 128 and the plurality of second perforations 130 are disposed in a linear pattern, as illustrated in FIGS. 1-8. In another embodiment (not shown), the plurality of first perforations 128 and the plurality of second perforations 130 are disposed in a non-linear pattern.

Referring now to FIG. 9, in a preferred embodiment, each wall of the plurality of upper housing walls 110, 112, 114, 116 and the plurality of lower housing walls 118, 120, 122, 124 includes an exterior skin 902, an interior skin 904, and a floatation material layer 906 is sandwiched between the exterior skin 902 and the interior skin 904. Although FIG. 9 depicts the exterior skin 902, the interior skin 904, and the floatation material layer 906 being present in the lower housing back wall 118, in a preferred embodiment, each wall of the plurality of upper housing walls 110, 112, 114, 116 and the plurality of lower housing walls 118, 120, 122, 124 includes the exterior skin 902, the interior skin 904, and the floatation material layer 906 which is sandwiched between the exterior skin 902 and the interior skin 904. In such preferred embodiment, the floatable pet kennel 100 is able to float either upright, on its side, or upside down. Exemplary embodiment depicted in FIG. 9 should not be construed as limiting the scope of the present disclosure.

In some embodiments, the exterior skin 902 of each wall faces ambient environment and forms exterior surface of the floatable pet kennel 100. The interior skin 904 of each wall faces an interior portion of the enclosure that houses the pet 108 and forms an interior surface of the floatable pet kennel 100.

In one embodiment, the exterior skin 902 and the interior skin 904 include or are made of plastic. In a preferred embodiment, the exterior skin 902 and the interior skin 904 include or are made of High Density Poly Ethylene (HDPE). Further, in a preferred embodiment, the floatation material layer 906 includes or is made of marine polyurethane foam. In yet another embodiment, the floatation material layer 906 includes or is made of closed-cell foam, and preferably, surrounded by a water-proof bladder material, as found in personal floatation devices (PFDs) that meet International and U.S. domestic regulations. Alternatively, the floatation material layer 906 is an air pocket sandwiched between the exterior skin 902 and the interior skin 904 of the floatable pet kennel 100.

In one embodiment, the exterior skin 902 and the interior skin 904 are molded with the floatation material layer 906. In another embodiment, the exterior skin 902 and the interior skin 904 are attached with the floatation material layer 906 via an industrial strength adhesive.

Figure 5:
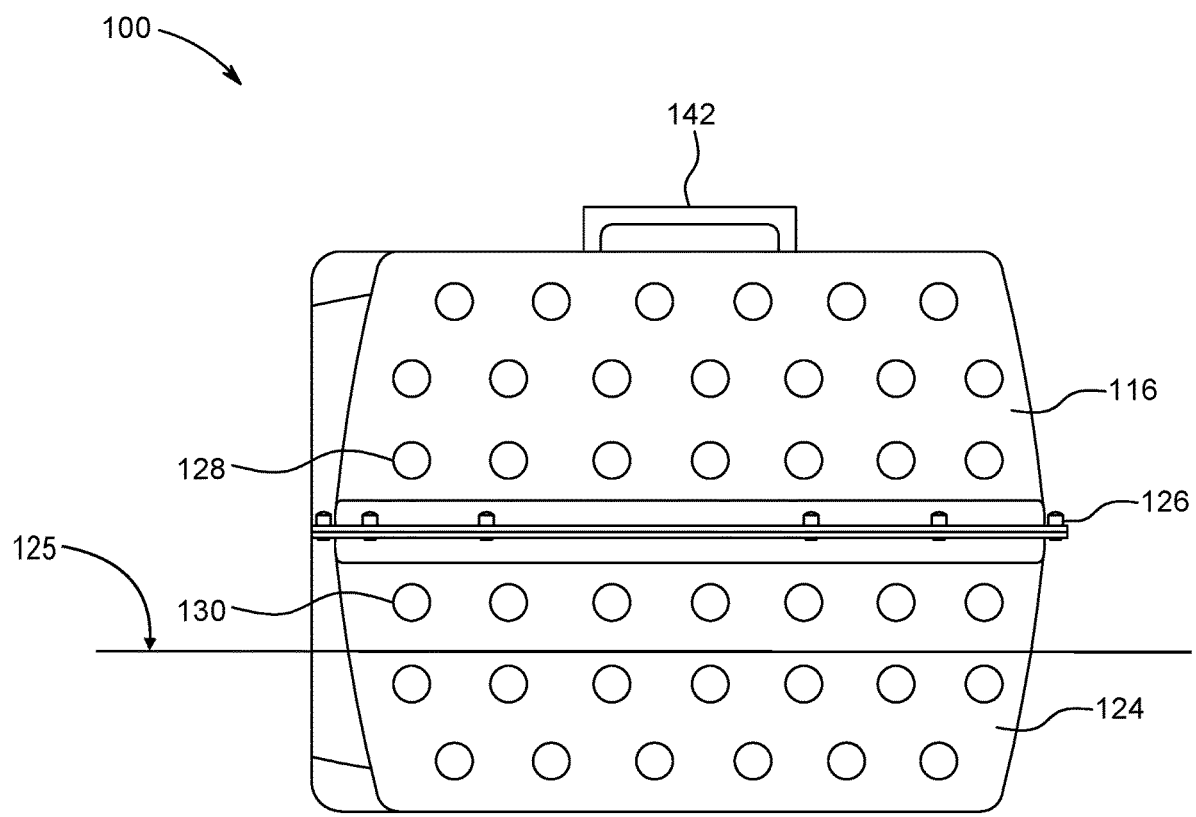
FIG. 5 is a left side view of the floatable pet kennel, in accordance with embodiments of the invention.
Figure 6:
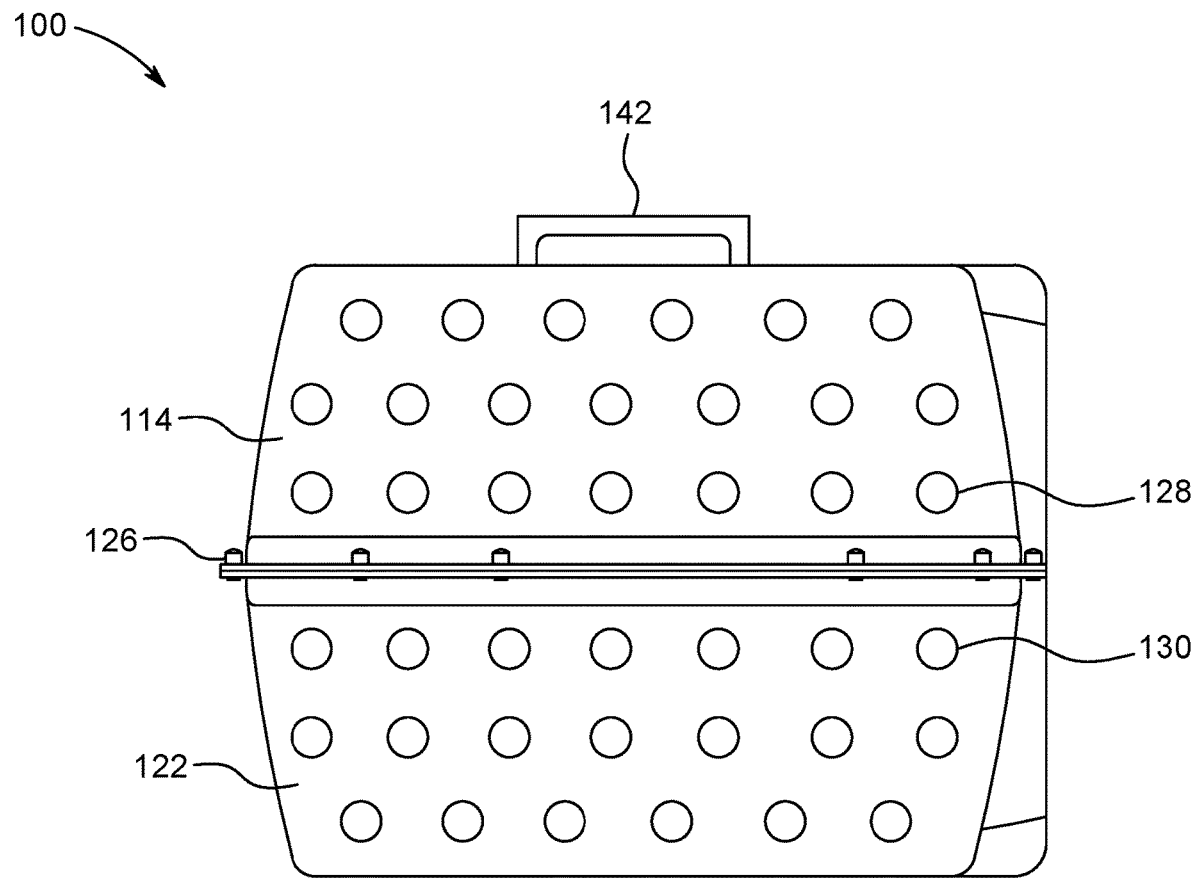
FIG. 6 is a right side view of the floatable pet kennel, in accordance with embodiments of the invention.
Figure 7:
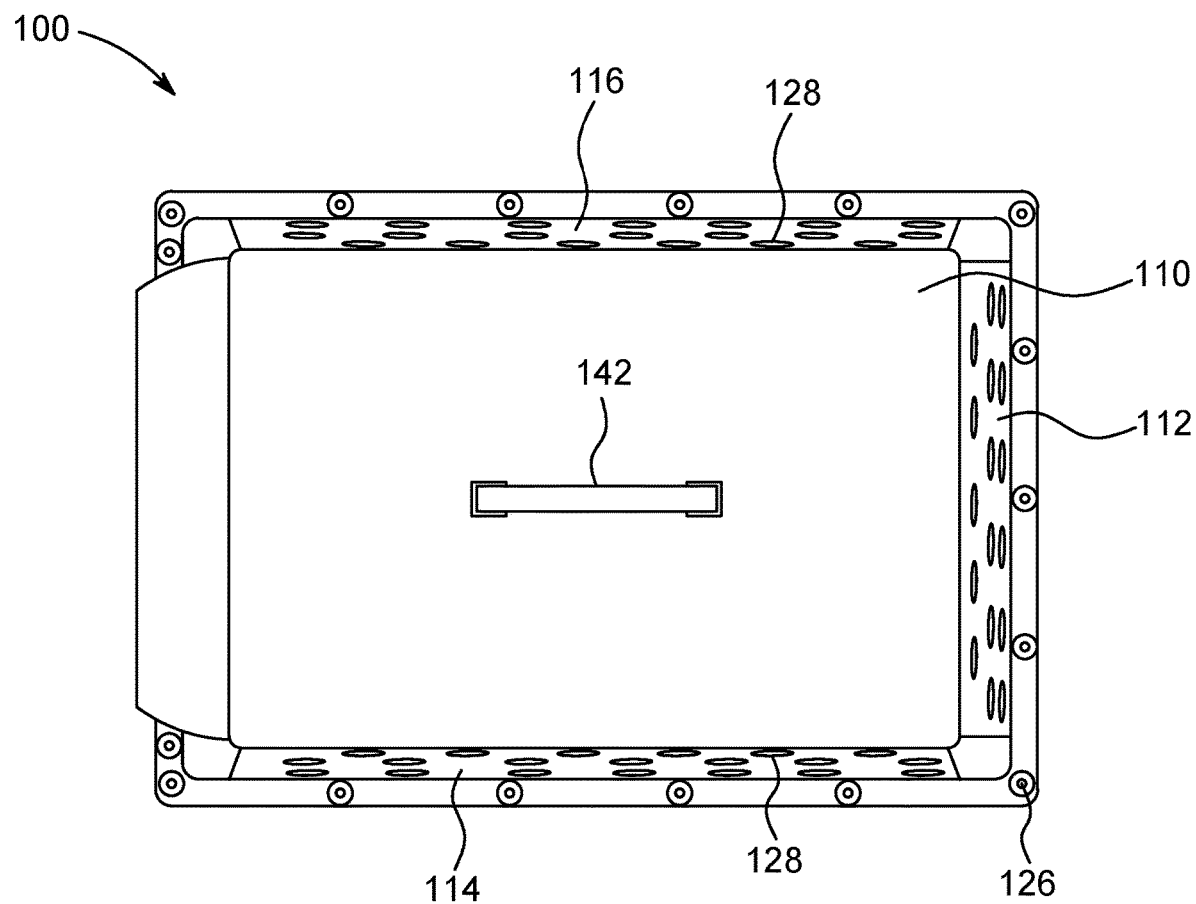
FIG. 7 is a top view of the floatable pet kennel, in accordance with embodiments of the invention.
Figure 8:
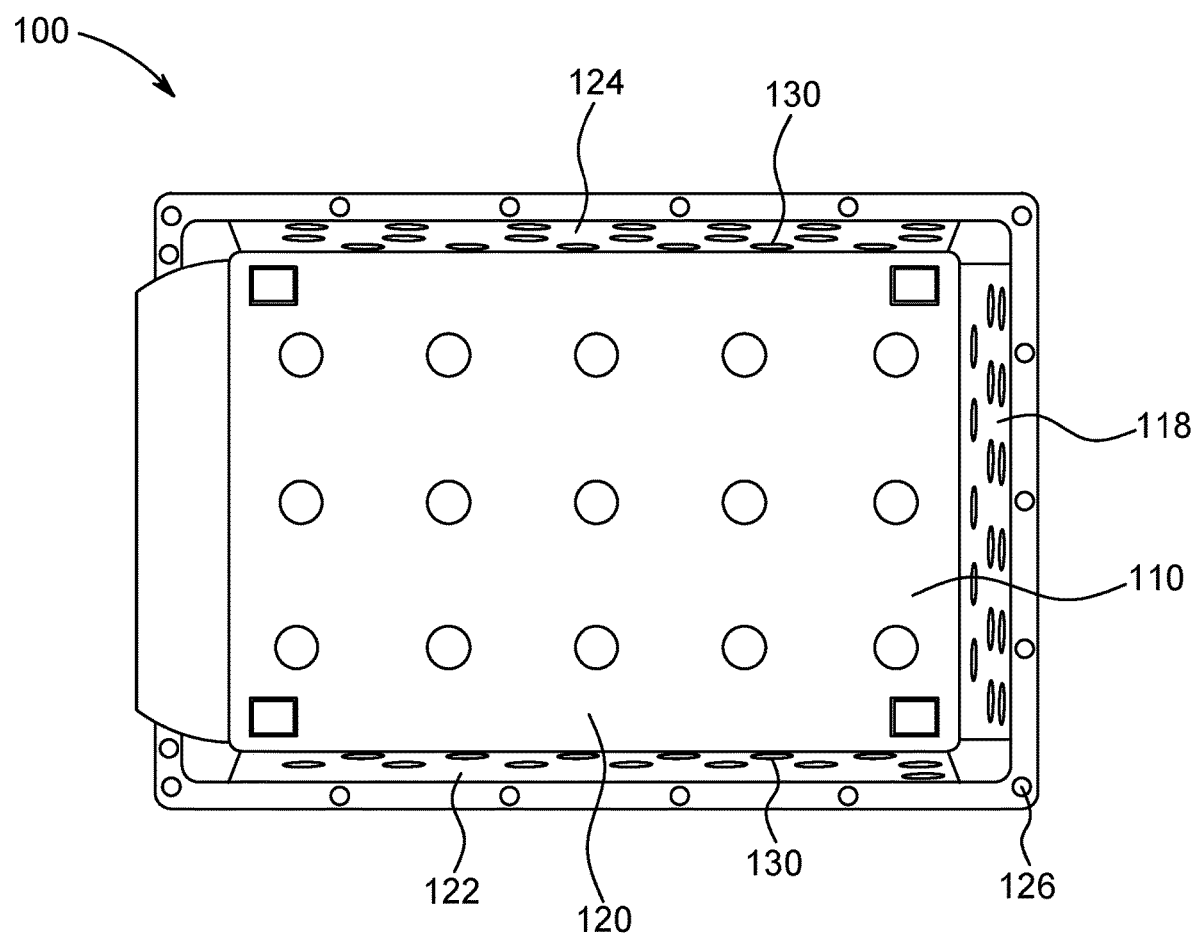
FIG. 8 is a bottom view of the floatable pet kennel, in accordance with embodiments of the invention.

The floatation material layer 906 on each wall of the plurality of upper housing walls 110, 112, 114, 116 and the plurality of lower housing walls 118, 120, 122, 124 enables the floatable pet kennel 100 to float in water 125, as illustrated in FIG. 5. Since each wall of the plurality of upper housing walls and the plurality of lower housing walls includes the floatation material layer 906, the floatable pet kennel 100 can float via any of the plurality of upper housing walls or the plurality of lower housing walls. For example, the floatable pet kennel 100 is configured to float right side up, left side up, bottom side up, top side up, etc., as each wall of the floatable pet kennel 100 includes the floatation material layer 906. In this manner, the floatable pet kennel 100 provides additional safety to the pet 108 during rescue operations during a flood event. For example, even if the floatable pet kennel 100 flips when the floatable pet kennel 100 is moved by the pet owner or the pet rescuer or storm water, or by movement of the pet 108 inside the enclosure, the floatable pet kennel 100 will not sink in flood waters because all of the walls include the floatation material layer 906.

In some embodiments, thickness of each of the exterior skin 902, the interior skin 904, and the floatation material layer 906 is less than one centimeter, which ensures that the floatable pet kennel 100 is lightweight. The dimension mentioned herein is not limiting, and the exterior skin 902, the interior skin 904, and the floatation material layer 906 can have any other different thickness.

Figure 3:
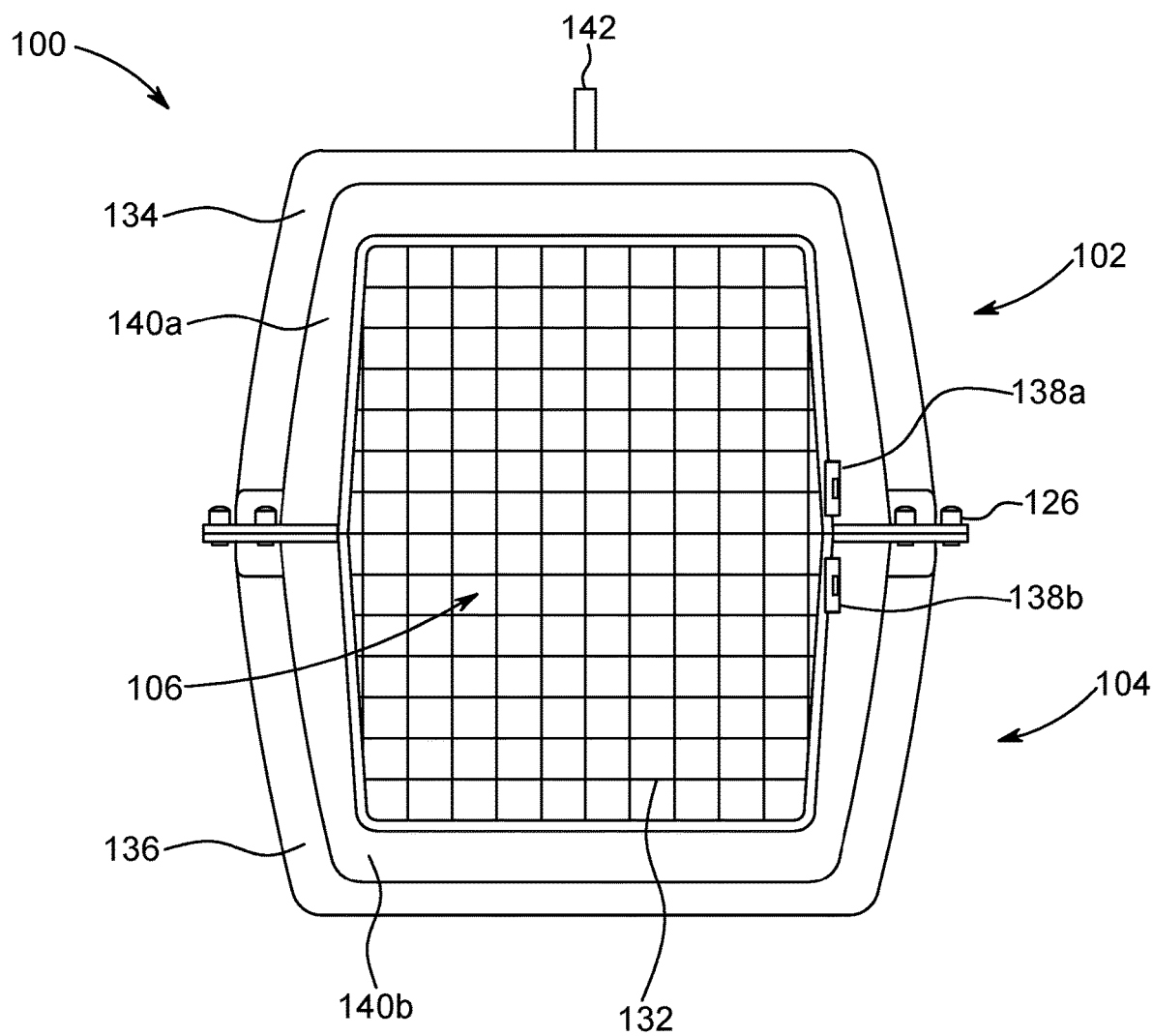
FIG. 3 is a front view of the floatable pet kennel, in accordance with embodiments of the invention.
Figure 4:
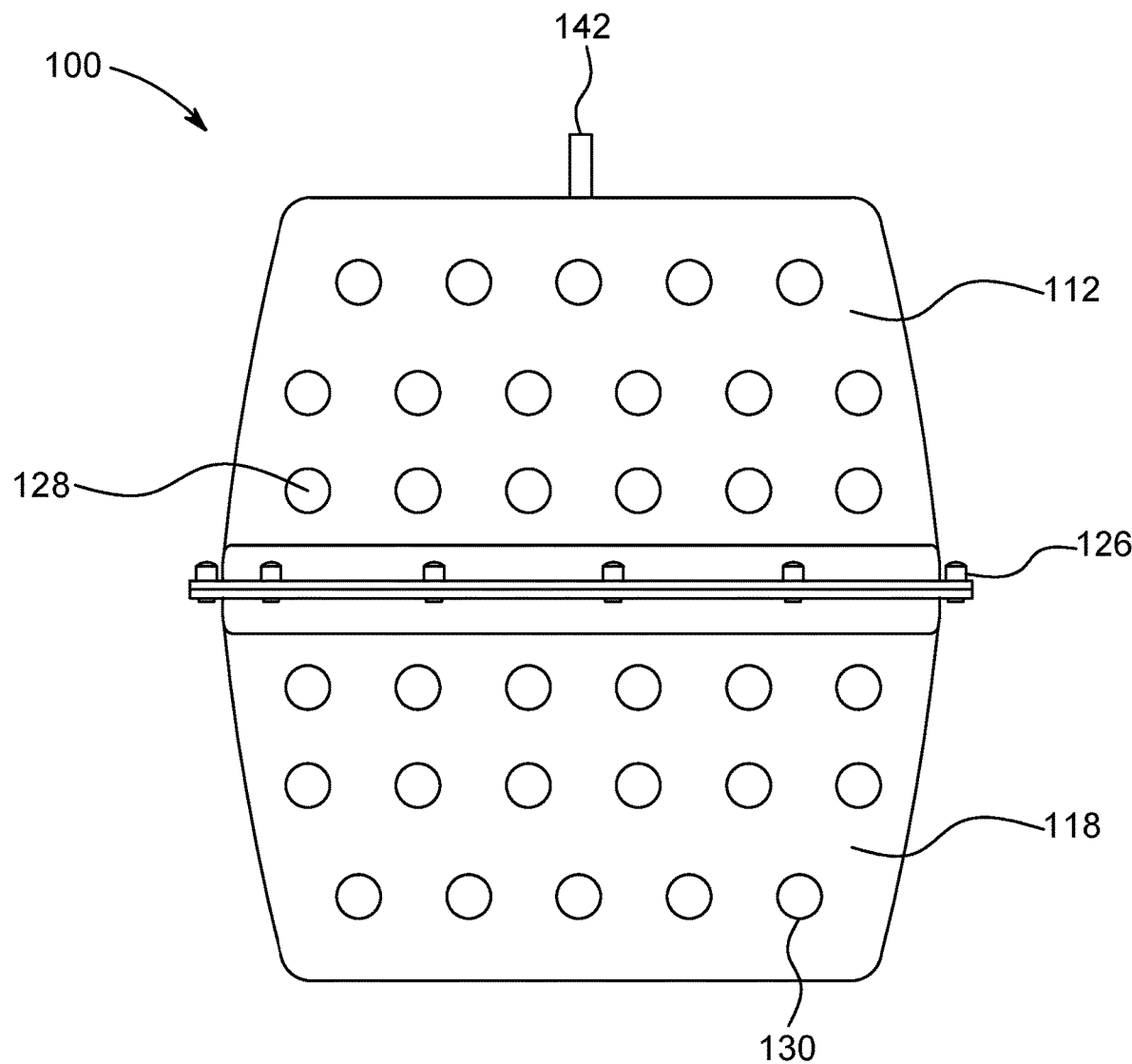
FIG. 4 is a back view of the floatable pet kennel, in accordance with embodiments of the invention.

In additional embodiments of the present disclosure, referring to FIGS. 1 and 3, the floatable pet kennel 100 includes a front door 132. In a preferred embodiment, the front door 132 is shaped as a rectangular mesh, as illustrated in FIGS. 1 and 3. The mesh structure ensures that the pet 108 can see outside the floatable pet kennel 100 when the pet 108 is housed in the enclosure. The mesh structure also enables air ventilation in the enclosure. In one embodiment, the front door 132 is made of metal, such as iron, aluminum, and/or the like. In another embodiment, the front door 132 is made of plastic.

In some embodiments, the front door 132 is removably disposed at the front opening 106 to enable the pet 108 to enter and exit the enclosure of the floatable pet kennel 100. In an exemplary embodiment, the plurality of upper housing walls additionally includes an upper housing front peripheral wall 134 that is disposed at a front periphery of the upper housing 102, as illustrated in FIGS. 1-3. Dimensions of the upper housing front peripheral wall 134 depend on the dimensions of the floatable pet kennel 100.

Similarly, the plurality of lower housing walls additionally includes a lower housing front peripheral wall 136 that is disposed at a front periphery of the lower housing 104, as illustrated in FIGS. 1-3. Dimensions of the lower housing front peripheral wall 136 depend on the dimensions of the floatable pet kennel 100.

In some embodiments, when the upper housing 102 is connected with the lower housing 104 via the fasteners 126, an area enclosed between the upper housing front peripheral wall 134 and the lower housing front peripheral wall 136 forms the front opening 106.

In some embodiments, the floatable pet kennel 100 further includes one or more door latching mechanisms 138a, 138b that are disposed on the upper housing front peripheral wall 134 and the lower housing front peripheral wall 136, respectively. In an exemplary embodiment, the front door 132 is removably attached to the upper housing front peripheral wall 134 and the lower housing front peripheral wall 136 via the door latching mechanisms 138a, 138b, as illustrated in FIGS. 1 and 3. In addition embodiments, the front door 132 is pivotally attached to the upper housing front peripheral wall 134 and the lower housing front peripheral wall 136 via the door latching mechanisms 138a, 138b. In this case, the door latching mechanisms 138a, 138b is a hinge through which the front door 132 is pivotally attached to the upper housing front peripheral wall 134 and the lower housing front peripheral wall 136. The front door 132 is configured to close and open via the door latching mechanisms 138a, 138b, to enable the pet 108 to enter and exit the enclosure of the floatable pet kennel 100.

In an exemplary embodiment, the upper housing front peripheral wall 134 and the lower housing front peripheral wall 136 include one or more extended curved surfaces 140a, 140b on which the door latching mechanisms 138a, 138b are disposed, as exemplified in FIGS. 1-3. In another embodiment (not shown), the upper housing front peripheral wall 134 and the lower housing front peripheral wall 136 do not include the extended curved surfaces 140a, 104b. In this case, the door latching mechanisms 138a, 138b are disposed on "flat" surfaces of the upper housing front peripheral wall 134 and the lower housing front peripheral wall 136.

In yet another embodiment (not shown), the plurality of upper housing walls and the plurality of lower housing walls do not include respective upper housing front peripheral wall 134 and the lower housing front peripheral wall 136. In this case, the door latching mechanisms 138a, 138b are disposed on either of the upper housing side walls 114, 116 and the lower housing side walls 122, 124.

In some embodiments, referring to FIGS. 1-7, the floatable pet kennel 100 further includes a handle 142 disposed at the upper housing top wall 110. In one embodiment, the handle 142 is disposed at a center portion of the upper housing top wall 110, and enables the pet owner to lift the floatable pet kennel 100. In an exemplary embodiment, the handle 142 is made of plastic.

In an alternative embodiment (not shown) of the present disclosure, the floatable pet kennel 100 does not include separate upper housing 102 and lower housing 104. Instead, the floatable pet kennel 100 includes a plurality of unitary walls including a bottom wall 120, a top wall 110, a back wall 112, and side walls 114, 116. In this embodiment, the side walls are connected to the top wall, the back wall and the bottom wall such that the plurality of walls forms a unitary structure of the floatable pet kennel 100. Further, the side walls are connected to the top wall, the back wall and the bottom wall to define an enclosure adapted to house the pet 108. Similar to the embodiments described above, in this embodiment as well, each wall of the plurality of walls includes the exterior skin 902, the interior skin 904 and the floatation material layer 906 sandwiched between the exterior skin 902 and the interior skin 904. Furthermore, in this embodiment, the front door 132 is preferably removably attached to at least one wall of the plurality of walls, and enables the pet 108 to enter and exit the enclosure, as described above. In addition, similar to the embodiments described above, in this embodiment as well, the bottom wall, the back wall and the side walls include the plurality of first perforations 128 and/or the plurality of second perforations 130.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:

1. A floatable pet kennel, comprising:
   an enclosure comprising an upper housing, a lower housing and a front opening, wherein the upper housing and the lower housing are connected to each other, the upper housing comprising a plurality of upper housing walls and the lower housing comprising a plurality of lower housing walls, wherein the upper housing and the lower housing are connected by a plurality of removable fasteners;

wherein each wall of the plurality of upper housing walls and the plurality of lower housing walls comprises an exterior skin, an interior skin, and a marine polyurethane foam floatation material layer sandwiched between the exterior skin and the interior skin, wherein said marine polyurethane foam floatation material is integrally molded with the exterior and interior skins to enhance buoyancy and structural integrity; and a front door removably disposed at the front opening to enable a pet to enter and exit the enclosure.

2. The floatable pet kennel of claim 1, further comprising a door latching mechanism disposed on at least one wall of the plurality of upper housing walls and the plurality of lower housing walls, the front door is configured to be removably attached to the at least one wall via the door latching mechanism.

3. The floatable pet kennel of claim 2, wherein the front door is configured to close and open via the door latching mechanism.

4. The floatable pet kennel of claim 1, wherein the plurality of upper housing walls comprises an upper housing back wall, an upper housing top wall, and upper housing side walls, wherein said upper housing side walls define a plurality of first perforations adapted for water drainage and ventilation, and wherein the plurality of lower housing walls comprises a lower housing back wall, a lower housing bottom wall, and lower housing side walls, wherein said lower housing side walls define a plurality of second perforations adapted for water drainage and ventilation.

5. The floatable pet kennel of claim 4, wherein the upper housing back wall defines the plurality of first perforations.

6. The floatable pet kennel of claim 4, wherein the lower housing bottom wall defines the plurality of second perforations.

7. The floatable pet kennel of claim 4, further comprising a handle disposed at the upper housing top wall, wherein the handle enables a user to lift the floatable pet kennel.

8. The floatable pet kennel of claim 1, wherein the exterior skin and the interior skin comprise plastic.

9. The floatable pet kennel of claim 1, wherein the exterior skin and the interior skin comprise High Density Poly Ethylene (HDPE).

10. The floatable pet kennel of claim 1, wherein the marine polyurethane foam floatation material layer comprises a closed-cell foam surrounded by a water-proof bladder material.

11. The floatable pet kennel of claim 1, wherein the exterior skin and the interior skin are molded with the marine polyurethane foam floatation material layer.

12. A floatable pet kennel, comprising:

an enclosure comprising an upper housing, a lower housing and a front opening, wherein the upper housing and the lower housing are removably connected to each other by a plurality of fasteners, the upper housing comprising a plurality of upper housing walls and the lower housing comprising a plurality of lower housing walls, wherein each wall of the plurality of upper housing walls and the plurality of lower housing walls comprises an exterior skin, an interior skin, and a marine polyurethane foam floatation material layer sandwiched between the exterior skin and the interior skin, wherein the plurality of upper housing walls comprises an upper housing back wall, an upper housing top wall, and upper housing side walls, wherein the plurality of lower housing walls comprises a lower housing back wall, a lower housing bottom wall, and lower housing side walls, and wherein the upper housing back wall and the upper housing side walls comprise a plurality of first perforations, and the lower housing back wall, the lower housing bottom wall, and the lower housing side walls comprise a plurality of second perforations; and a front door removably disposed at the front opening to enable a pet to enter and exit the enclosure.

13. The floatable pet kennel of claim 12, wherein the exterior skin and the interior skin comprise plastic.

14. The floatable pet kennel of claim 12, wherein the exterior skin and the interior skin comprise High Density Poly Ethylene (HDPE).

15. The floatable pet kennel of claim 12, wherein the floatation material layer comprises marine polyurethane foam.

16. The floatable pet kennel of claim 12, wherein the exterior skin and the interior skin are molded with the floatation material layer.

17. A floatable pet kennel, comprising:

a plurality of walls comprising a bottom wall, a top wall, a back wall, and side walls, wherein the side walls are connected to the bottom wall, the top wall and the back wall to define an enclosure adapted to house a pet, and wherein each wall of the plurality of walls comprises an exterior skin, an interior skin, and a marine polyurethane foam floatation material layer sandwiched between the exterior skin and the interior skin; and a front door removably attached to at least one wall of the plurality of walls, wherein the front door enables the pet to enter and exit the enclosure.

18. The floatable pet kennel of claim 17, wherein the exterior skin and the interior skin are molded with the marine polyurethane foam floatation material layer, wherein said molding is configured to enhance buoyancy.

19. The floatable pet kennel of claim 17, wherein the exterior skin and the interior skin comprise plastic.

20. The floatable pet kennel of claim 17, wherein the marine polyurethane foam floatation material layer comprises a closed-cell foam surrounded by a water-proof bladder material.

* * * * *